United States Patent [19]
Iwasaki et al.

[11] Patent Number: 5,949,748
[45] Date of Patent: *Sep. 7, 1999

[54] OPTICAL WRITE/READ HEAD WITH A PRETILTED LIQUID CRYSTAL PANEL

[75] Inventors: Masayuki Iwasaki; Sakashi Ootaki, both of Saitama, Japan

[73] Assignee: Pioneer Electronic Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/815,084

[22] Filed: Mar. 11, 1997

[30] Foreign Application Priority Data

Mar. 12, 1996 [JP] Japan ......................... 8-54670

[51] Int. Cl.$^6$ ......................................................... G11B 7/00
[52] U.S. Cl. ............................................. 369/58; 369/112
[58] Field of Search .................... 369/44.23, 44.24, 369/112, 110, 109, 118, 58

[56] References Cited

U.S. PATENT DOCUMENTS

| | | | |
|---|---|---|---|
| 4,853,911 | 8/1989 | Yamazaki | 369/110 |
| 5,210,627 | 5/1993 | Toide et al. | 369/110 |
| 5,563,870 | 10/1996 | Silverstein | 369/110 |
| 5,594,713 | 1/1997 | Komma et al. | 369/112 |

*Primary Examiner*—Nabil Hindi
*Attorney, Agent, or Firm*—Sughrue, Mion, Zinn Macpeak & Seas, PLLC

[57] ABSTRACT

A compatible optical pickup for DVD and CD in which, between an objective lens and a polarizing beam splitter, there is disposed a transmission type liquid crystal panel which has transparent electrodes formed with an aperture pattern having a predetermined configuration which gives transmitted light a phase difference, such as ¼ of a wavelength or an odd multiple thereof. The liquid crystal panel is tilted and disposed with a predetermined angle between an objective lens and said laser light source for causing a phase difference in a laser beam emitted from said laser light source, whereby the liquid crystal panel is tilted with a predetermined pretilted angle θ so that liquid crystal molecules are aligned, in perpendicular relation to (for P-type liquid crystal) or in parallel relation with (for N-type liquid crystal) an optical axis of the objective lens at the time when no voltage is applied.

14 Claims, 11 Drawing Sheets

OPTICAL AXIS

OPTICAL AXIS

OPTICAL AXIS

OPTICAL AXIS

OPTICAL AXIS $\Delta n = n_1 - n_2$
BIREFRINGENCE

OPTICAL WRITE/READ HEAD WITH A PRETILTED LIQUID CRYSTAL PANEL

FIELD OF THE INVENTION

The present invention relates to an optical pickup for reading or recording information from or on an optical disk, and more particularly to a compatible optical pickup that can be used in both digital video disks (DVDs) and compact disks (CDs).

DESCRIPTION OF THE RELATED ART

DVDs are optical disks that can record very large quantities of digital information. Digital information, such as moving picture and computer related information, can be recorded on a disk having the same diameter as that of a CD with a recording density which is 6 to 8 times higher than that of the CD. In order to achieve high recording density such as above, there have been developed various methods for DVDs. For example, according to a super-density disk (SD), which is one kind of DVDs, a wavelength of laser light from a light source is made 650 nm or 635 nm, which is shorter than 780 nm of a CD, in order to increase storage capacity. Also, the numerical aperture (NA) of an objective lens is made 0.6 which is greater than 0.45 of a CD. Furthermore, moving picture coding experts group (MPEG) 2 is employed as a data compression algorithm. In this way, high-density recording of about 5 G byte data, which is approximately eight (8) times higher than that of a CD, is achieved on one side of a disk.

As previously described, a DVD performs considerably high-density recording as compared with a CD, so there is the need to considerably reduce the spot diameter of a laser beam for reading out pit information in comparison with that of a CD. The spot diameter of a laser beam is proportional to the wavelength λ of a laser in use, and is inversely proportional to the numerical aperture (NA) of an objective lens. In SDs, a reduction in the spot diameter of a laser beam is realized by using a laser light source which emits a short wavelength and an objective lens having a large numerical aperture (NA).

Further, a DVD and CD are optical disks of the same recording types, so it is desirable that information recorded on the CD can be read out with a DVD player. Hence, the present inventors have proposed an optical pickup which can be usable in both the DVDs and CDs by employing a liquid crystal panel (Japanese Patent Application No. HEI 7-199500). In FIGS. 8 through 10, there is shown an optical pickup disclosed in this patent application.

In FIG. 8, the optical pickup is comprised of a laser light source 1, a polarizing beam splitter 2, a collimator lens 3, a liquid crystal panel 4, an objective lens 5, an optical disk 6, a condenser lens 7, a light receiver 8, and a liquid crystal panel control circuit 9. The laser beam B emitted from the laser light source 1 passes through the polarizing beam splitter 2 and is collimated by the collimator lens 3. The collimated beam passes through the liquid crystal panel 4 and is focused on the information storage surface of the optical disk 6 through the objective lens 5.

The laser beam reflected at the information storage surface of the optical disk 6 passes through the objective lens 5, the liquid crystal panel 4, and the collimator lens 3 and then reaches to the polarizing beam splitter 2. Subsequently, the laser beam is reflected in a horizontal direction at the plane of polarization of the polarizing beam splitter 2 as hereinafter described. The reflected laser beam is then focused on the light receiver 8 through the condenser lens 7.

In FIG. 9, there is shown the structure of the aforementioned liquid crystal panel 4. Reference numerals 401a denote transparent glass substrates. On the inner surfaces of the glass substrates 401a, transparent electrodes 402a are deposited. On the inner surfaces of the transparent electrodes 402a, surface alignment films 403a are formed for providing a liquid crystal with a predetermined molecular orientation. Between the surface alignment films 403a, there is enclosed a liquid crystal 404 such as a nematic liquid crystal which is capable of causing birefringence.

The aforementioned transparent electrodes 402a are formed, respectively, into a shape of an electrode having a circular aperture pattern 405 cut out at the center position, and the electrodes 402a are constructed so that voltage can be applied thereon exclusive of the circular aperture pattern 405.

The cell thickness d of the liquid crystal 404 which is enclosed between the aforementioned glass substrates 401 is set to a thickness such as to cause a phase difference of λ/4 of a wavelength or an odd multiple thereof in a laser beam which passes through this liquid crystal, that is, a thickness such as satisfying $\Delta n \cdot d = \lambda/4, 3\lambda/4, 5\lambda/4 \ldots$ where $\Delta$ is the birefringence of liquid crystal molecule M, as shown in FIG. 11. In the figure, reference character $n_1$ represents the refraction in the direction of the optical axis of liquid crystal molecule M and reference character $n_2$ represents the refraction in a direction perpendicular to $n_1$. Note that a liquid crystal where birefringence $\Delta n$ is positive ($\Delta n > 0$) is called a P-type liquid crystal and that a liquid crystal where birefringence $\Delta n$ is negative ($\Delta n < 0$) is called an N-type liquid crystal.

In FIG. 9, there is shown an example wherein a P-type liquid crystal is employed. A molecular alignment of the liquid crystal is directed by the surface alignment films 403a so that, when it is viewed in a direction from a cross section (A), the optical axis of liquid crystal molecule M (see FIG. 11) is in parallel with the glass substrates 401a, and when it is viewed in a direction from a plane (B), the optical axis of the liquid crystal molecule M is oriented in a direction of 45° or a diagonal direction. The direction of the optical axis of the liquid crystal molecule M provides the plane of polarization of light. Therefore, in the case of the liquid crystal panel 4 of FIG. 9, the plane of polarization is arranged in a diagonal direction (or a direction of 45°). The liquid crystal panel 4 with such a structure is disposed in such a manner that the plane of polarization P of the panel 4 forms an angle of 45° with respect to the plane of polarization P of the polarizing beam splitter 2, as shown in FIG. 8.

Now, the operation of the optical pickup constructed in the aforesaid manner will be described.

When information is read from or recorded on a DVD such as a SD, a DVD selection signal is supplied on the liquid crystal panel control circuit 9. When the DVD selection signal is supplied to the liquid crystal panel control circuit 9, no voltage is fed from the liquid crystal panel control circuit 9 to the liquid crystal panel 4. Therefore, the state of the liquid crystal panel 4 at this time is equivalent to an OFF state of switch SW of FIG. 9A. For this reason, the enclosed liquid crystal panel 404 remains in a homogeneous state such as that shown in FIGS. 9A and 9B, so the overall area of the liquid crystal panel 4 acts as a so-called quarter wave plate.

If the overall area of the liquid crystal panel 4 is set so as to act as the quarter-wave plate in the way shown above, all the laser beams B emitted from the laser light source 1 and passing through the liquid crystal panel 4 will be converted from linearly polarized light to circularly polarized light. Hence, the laser beam B converted to the circularly polarized light is reflected by the optical disk 6 and passes through the liquid crystal panel 4 again. At this time, the reflected laser beam B is recovered from circularly polarization to the linearly polarization.

The plane of polarization of the reflected beam recovered to the linearly polarized light is rotated into a direction perpendicular to the plane of polarization of the polarizing beam splitter 2, as shown by an arrow in dotted line of FIG. 8. Therefore, the reflected beam from the optical disk 6 is reflected horizontally by the plane of polarization of the polarizing beam splitter 2 and sent to the light receiver 8 through the condenser lens 7.

Thus, when playing back a DVD, the overall area of the liquid crystal panel 4 acts as the quarter-wave plate and the reflected light beam is entirely sent to the light receiver 8, so that the whole surface of the objective lens 5 is used. Therefore, if the numerical aperture (NA) of the objective lens 5 is set to a value suitable for a DVD, for example, 0.6 for a SD, information can be efficiently read from or recorded on a DVD.

Note that, when information is recorded on a DVD, the output power of the laser light source 1 is increased and also the laser beam B emitted from the laser light source 1 is optically modulated by information to be recorded. When a DVD is of a phase change mode disk, the only requirement is that an optically modulated laser beam is projected onto the disk surface. In the case when a DVD is of a magneto-optical disk, a laser beam optically modulated by information to be recorded is projected, and at the same time, it is necessary that a magnetic field is applied on a surface of the disk at the beam spot by magnetic-field generation means (not shown).

On the other hand, when playing back a CD, a CD selection signal is supplied to the liquid crystal panel control circuit 9. When the CD selection signal is supplied to the liquid crystal panel control circuit 9, a predetermined voltage is fed to the transparent electrodes 402a of the liquid crystal panel 4 from the liquid crystal panel control circuit 9. Therefore, in this case, the liquid crystal panel 4 is equivalent to the ON state of the switch SW shown in FIG. 10A.

When the switch SW is turn on to the ON state, a voltage of (e) is applied to the transparent electrodes 402a and therefore the enclosed liquid crystal 404 is oriented perpendicular to the substrates 401a at only the portion of the liquid crystal between the transparent electrodes 402a, as shown in FIGS. 10A and 10B. This portion is no longer operating as a quarter-wave plate. For this reason, only the portion of the circular aperture pattern 405 acts as the quarter-wave plate.

As described above, if only the portion of the circular aperture pattern 405 acts as the quarter-wave plate, only the laser beams passing through this aperture pattern 405 will be polarized while the laser beams passing through the transparent electrodes 402a will be by no means polarized.

Therefore, in the case when playing back a CD, only the laser beams passing through the circular aperture pattern 405 which acts as a quarter-wave plate are reflected, into a horizontal direction, at the surface of the polarizing beam splitter 2 whereat a polarization film is provided and, then, the reflected laser beams enter into the light receiver 8 through the condenser lens 7. On the other hand, the laser beams passing through the transparent electrodes 402a pass through the polarizing beam splitter 2 without being reflected at the surface of the polarizing beam splitter 2 whereat a polarization film is provided.

That is, it is equivalent to that only the laser beams passing through the outer peripheral portion of the lens where has a large aberration are cut among the laser beams passing through the objective lens 5, so the numerical aperture (NA) of the object lens 5 is reduced accordingly. Therefore, by setting the configuration of the aperture pattern 405 to provide equivalently the numerical aperture (NA) of the objective lens 5 which is suitable for a CD, such as NA=0.37 or the like (for 650 nm of a laser wavelength in use), information can be efficiently read from the CD by using the same optical pickup as that of the DVD.

Further, as shown in FIG. 8, the liquid crystal panel 4 is positioned on the optical axis of the objective lens 5 and disposed perpendicular (90°) to the optical axis. Thus, in the case of the liquid crystal panel 4 being disposed perpendicular to the optical axis, the laser light reflected at the surface of the glass substrate 401 and transparent electrodes 402a of the liquid crystal often becomes stray light and enters into the light receiver 8. In order to prevent this phenomenon from happening, there is the need to form anti-reflection films on the interfaces between the glass substrate 401a and the transparent electrode 402a and between the transparent electrode 402a and the surface alignment film 403a and, consequently, the optical pickup will be expensive.

Also, in the liquid crystal panel 4 as an actual product, as shown in FIG. 12, the liquid crystal 404 is enclosed by providing liquid crystal molecules M with a pretilted angle of θ through the use of the surface alignment film 403a. If the liquid crystal molecules M have not been aligned at a pretilted angle, the liquid crystal molecules M cannot determine in which direction they move upon application of a voltage, and the respective liquid crystal molecules move randomly when the voltage is applied, consequently, satisfactory characteristics can not be obtained. Therefore, the liquid crystal panel 4 as an actual product has always been provided with liquid crystal molecules having the aforementioned pretilted angle. As for this pretilted angle θ, θ=2 to 20°, approximation, is selected for a P-type liquid crystal wherein liquid crystal molecules have a homogeneous structure when no voltage is applied, as shown in FIG. 9A, and θ=89 to 80°, approximately, is selected for an N-type liquid crystal wherein liquid crystal molecules have a homeotropic structure when no voltage is applied.

As has been described, if the liquid crystal molecules M of the liquid crystal panel 4 are pretilted, they will not cross the laser beams being transmitted at a right angle, but they will cross the laser beams with an angle tilted by the pretilted angle θ. If the liquid crystal molecules M cross laser beams at the tilted angle, it means that the liquid crystal panel 4 cannot act as a perfect quarter-wave plate.

That is, if the liquid crystal panel 4 acts as a perfect quarter-wave plate and a laser beam consisting of linearly polarized light is incident upon the liquid crystal panel 4, the laser beam after transmitting through the liquid crystal panel will become a perfect circularly polarized light such as shown in FIG. 13. However, if the liquid crystal molecules M of the liquid crystal panel 4 has been provided with a pretilted angle θ, the laser beam after transmitting the liquid crystal will become an elliptically polarized light such as the one shown in FIG. 14 corresponding to the pretilted angle θ. This reduces a coefficient of utilization of the light and leaks an unwanted light toward the light receiver 8, thus the S/N ratio is greatly decreased.

SUMMARY OF THE INVENTION

It is therefore an objective of the present invention to eliminate drawbacks of the prior art and to provide an optical pickup which is capable of causing a liquid crystal panel to act as a perfect quarter-wave plate even if liquid crystal molecules have been given a pretilted angle, and that an optical pickup which is excellent in both coefficient of utilization of light and S/N ratio.

According to one aspect of the present invention, there is provided an optical pickup which comprises: a laser light source; a polarizing beam splitter; an objective lens; a transmission type liquid crystal panel disposed between the objective lens and the polarizing beam splitter, the liquid crystal panel having transparent electrodes formed respectively with an aperture pattern having a predetermined configuration which causes a phase difference of ¼ of a wavelength or an odd multiple thereof in a laser beam when passed through the liquid crystal; and control means for applying a voltage to the transparent electrodes of the liquid crystal panel so that the overall area of the liquid crystal panel is operated as a quarter-wave plate when information is read from or recorded on an optical disk for high-density recording and that only the aperture pattern portion is operated as a quarter-wave plate when information is read from a compact disk, wherein a P-type liquid crystal panel being provided liquid crystal molecules with a predetermined pretilt angle and the liquid crystal panel is tilted and disposed so that liquid crystal molecules are aligned in perpendicular to an optical axis of the objective lens when no voltage is applied.

According to another aspect of the present invention, there is provided an optical pickup which comprises: a laser light source; a polarizing beam splitter; an objective lens; a transmission type liquid crystal panel disposed between the objective lens and the polarizing beam splitter, the liquid crystal panel having transparent electrodes formed respectively with an aperture pattern having a predetermined configuration which causes a phase difference of ¼ of a wavelength or an odd multiple thereof in a laser beam when passes through the liquid crystal; and control means for applying a voltage to the transparent electrodes of the liquid crystal panel so that the overall area of the liquid crystal panel is operated as a quarter-wave plate when information is read from or recorded on an optical disk for high-density recording and that only the aperture pattern portion is operated as a quarter-wave plate when information is read from a compact disk, wherein an N-type liquid crystal panel being provided liquid crystal molecules with a predetermined pretilt angle and the liquid crystal panel is tilted and disposed so that liquid crystal molecules are aligned in parallel with an optical axis of the objective lens when no voltage is applied.

Since the optical pickup according to the present invention employs the means such as above, even if liquid crystal molecules have been given a pretilted angle, it is possible for the liquid crystal panel to act as a perfect quarter-wave plate, and the coefficient of utilization of light and the S/N ratio can be enhanced. Further, since the liquid crystal panel is tilted, even if a laser beam is reflected at the surfaces of the glass substrate and transparent electrodes of the liquid crystal panel, the beam shall be reflected in a direction away from an optical axis, thus no stray light enters into a light receiver.

BRIEF DESCRIPTION OF THE DRAWINGS

The present invention will be described in further detail with reference to the accompanying drawings, in which.

DETAILED DESCRIPTION OF THE PREFERRED EMBODIMENTS

Figure 1:
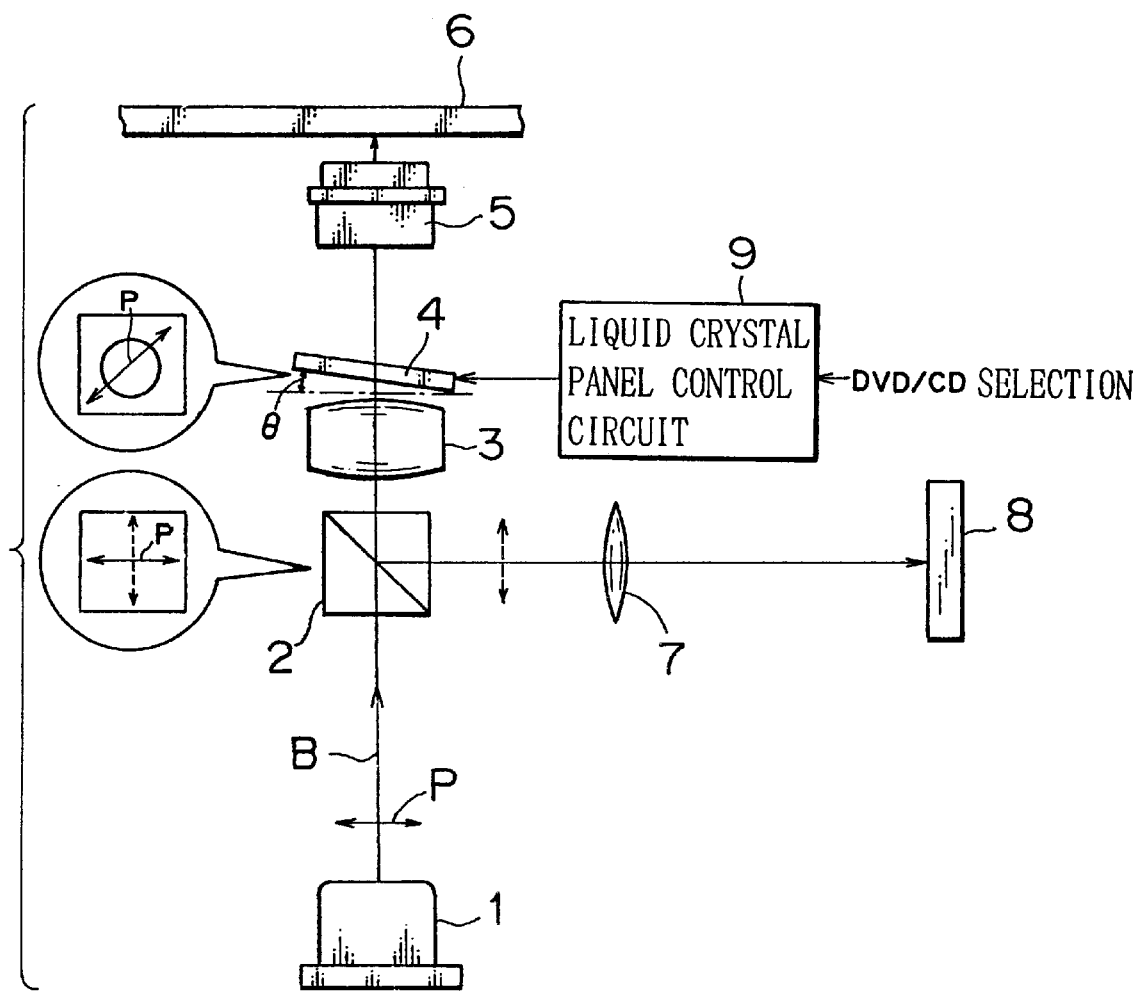
FIG. 1 is a schematic diagram showing the entire structure of an optical pickup embodying the present invention.
Figure 2:
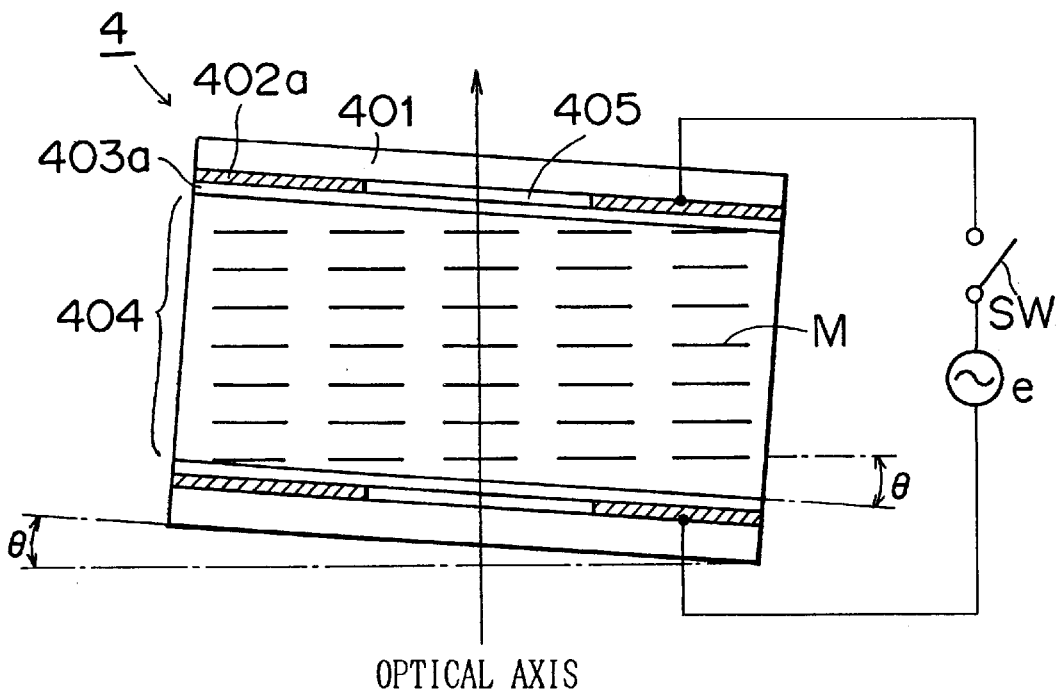
FIG. 2 is an enlarged schematic diagram showing an operation of the liquid crystal panel of FIG. 1 when no voltage is applied.

Referring to FIGS. 1 and 2, there is shown a preferred embodiment of an optical pickup in accordance with the present invention. In the figures, the same numerals designate the same parts as that of the aforementioned optical pickup of FIGS. 8 and 9 or corresponding parts and, therefore, a detailed description is omitted for avoiding redundancy.

Figure 8:
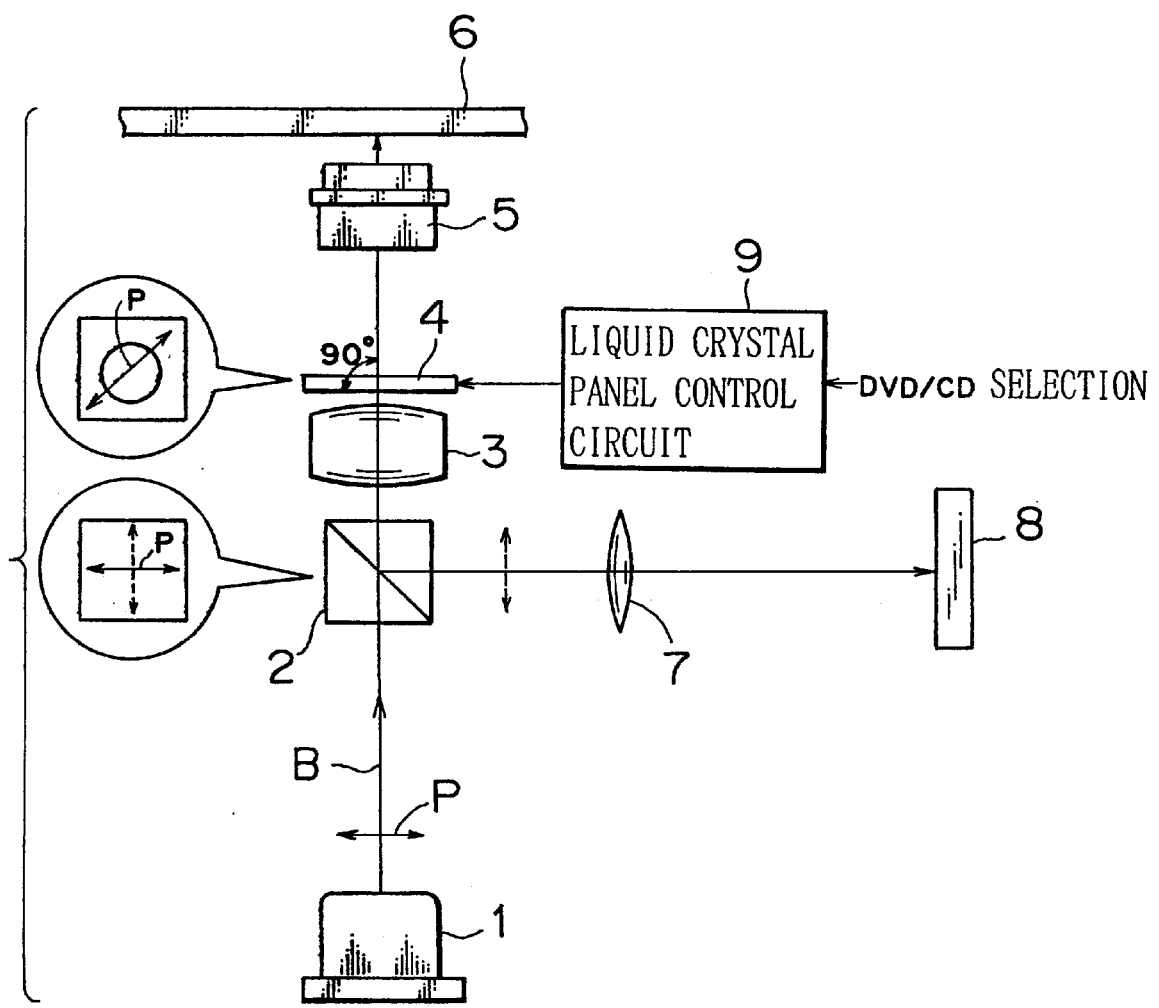
FIG. 8 is a schematic diagram showing the entire structure of a related-art optical pickup.
Figure 9A:
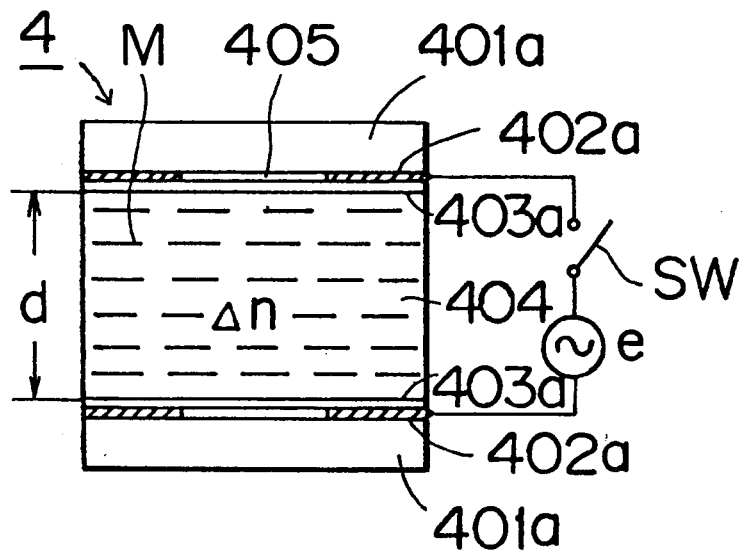
FIGS. 9A and 9B are diagrams showing the structure of the liquid crystal panel in FIG. 8.
Figure 9B:
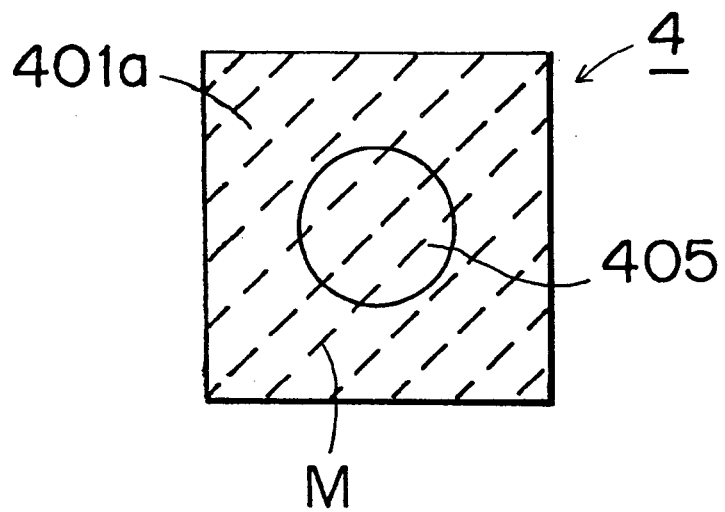
Figure 10A:
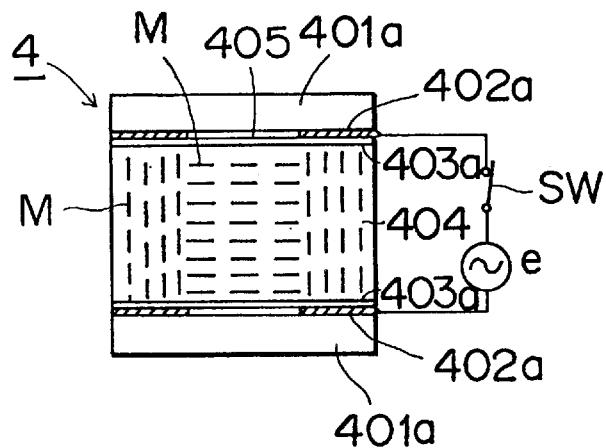
FIGS. 10A and 10B are diagrams showing an operation of the liquid crystal panel of FIG. 9 when a voltage is applied.
Figure 10B:
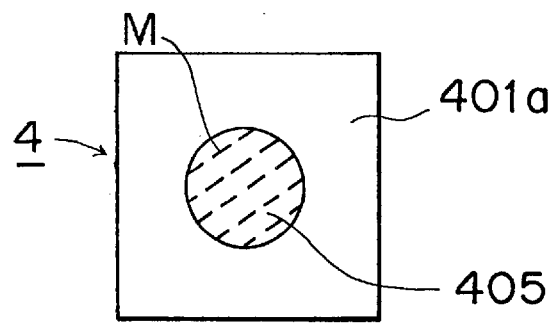
Figure 11:
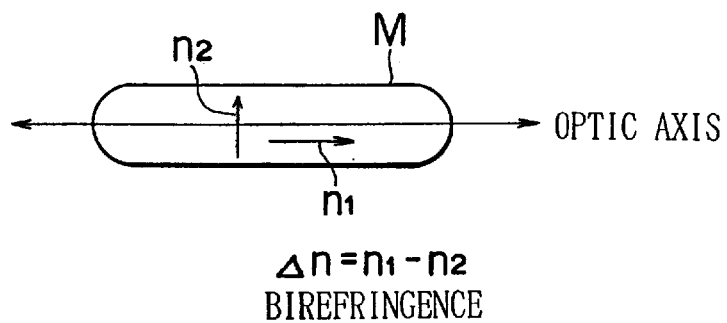
FIG. 11 is a diagram showing the birefringence of a liquid crystal molecule.
Figure 12:
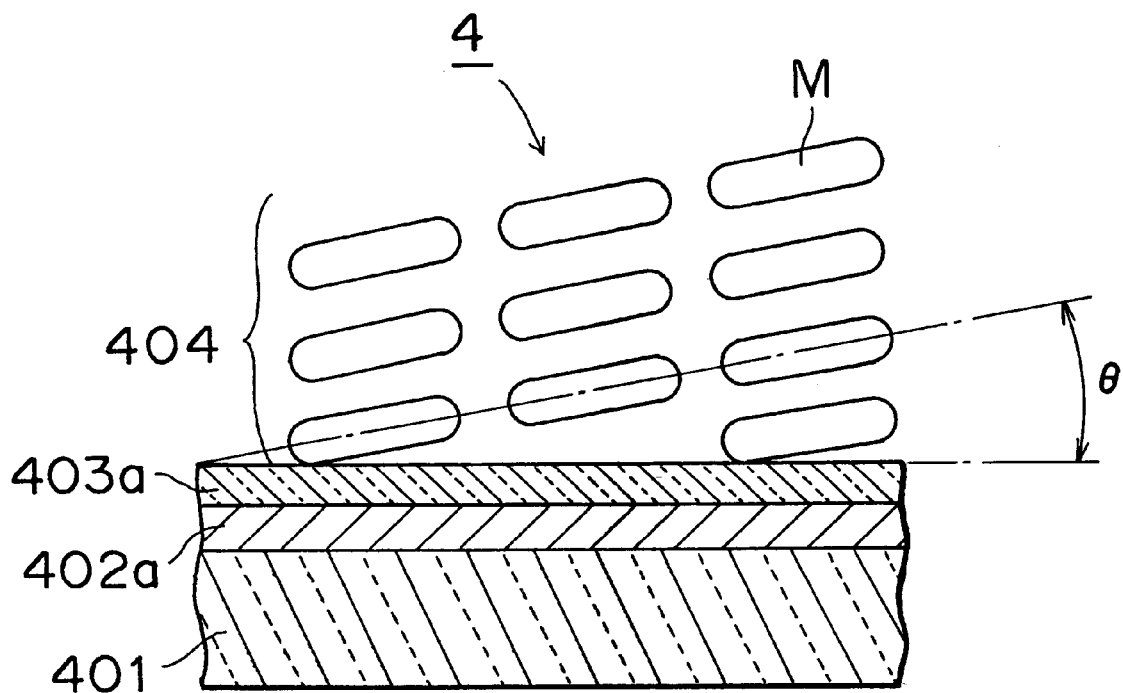
FIG. 12 is a diagram showing the liquid crystal molecules provided with a pretilted angle.

As shown in FIG. 1, the difference of the optical pickup embodying the present invention from the aforementioned pickup of FIG. 8, is such that a liquid crystal panel 4 itself is disposed by tilting an amount of the pretilted angle $\theta$ of the liquid crystal molecules relative to the optical axis of an objective lens 5, so that the liquid crystal molecules enclosed within the liquid crystal panel 4 are arranged perpendicular to the optical axis of the objective lens 5.

That is, in the case of a P-type liquid crystal, the liquid crystal molecules M have a homogeneous structure to be aligned in parallel to a glass substrate 401, however, as described above, the enclosed liquid crystal molecules M have been provided with a predetermined pretilted angle ($\theta$=2 to 20°, approximation) by utilizing surface alignment films 403a, as shown in FIG. 2. Hence, the liquid crystal panel 4 is tilted by the pretilted angle $\theta$ and is disposed so that the liquid crystal molecules M are aligned in perpendicular relation to the optical axis of the objective lens 5.

In such disposition, when information is read from a DVD, since no voltage is applied to transparent electrodes 402a, all the liquid crystal molecules M are aligned in perpendicular relation to the optical axis of the objective lens 5 and the overall area of the liquid crystal panel 4 acts as a perfect quarter-wave plate. Therefore, the laser beam B consisting of linearly polarized light incident on the liquid crystal panel 4, is emitted as perfect circularly polarized light, such as the one shown in FIG. 13, after transmitting through the liquid crystal panel 4.

Figure 3:
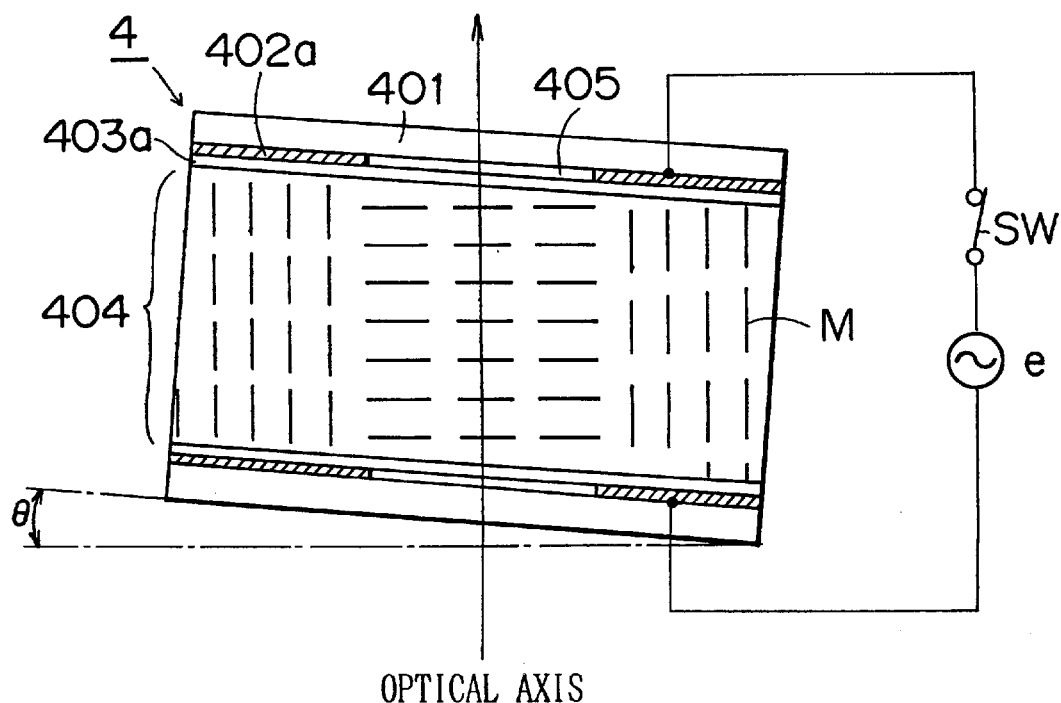
FIG. 3 is an enlarged schematic diagram showing an operation of the liquid crystal panel of FIG. 1 when a voltage is applied.

On the other hand, in playing back a CD, since a voltage is applied only to the outer transparent electrodes 402a around a center aperture pattern 405, as shown in FIG. 3, and only the portion defined by the center aperture pattern 405 is controlled to act as a quarter-wave plate.

Figure 4:
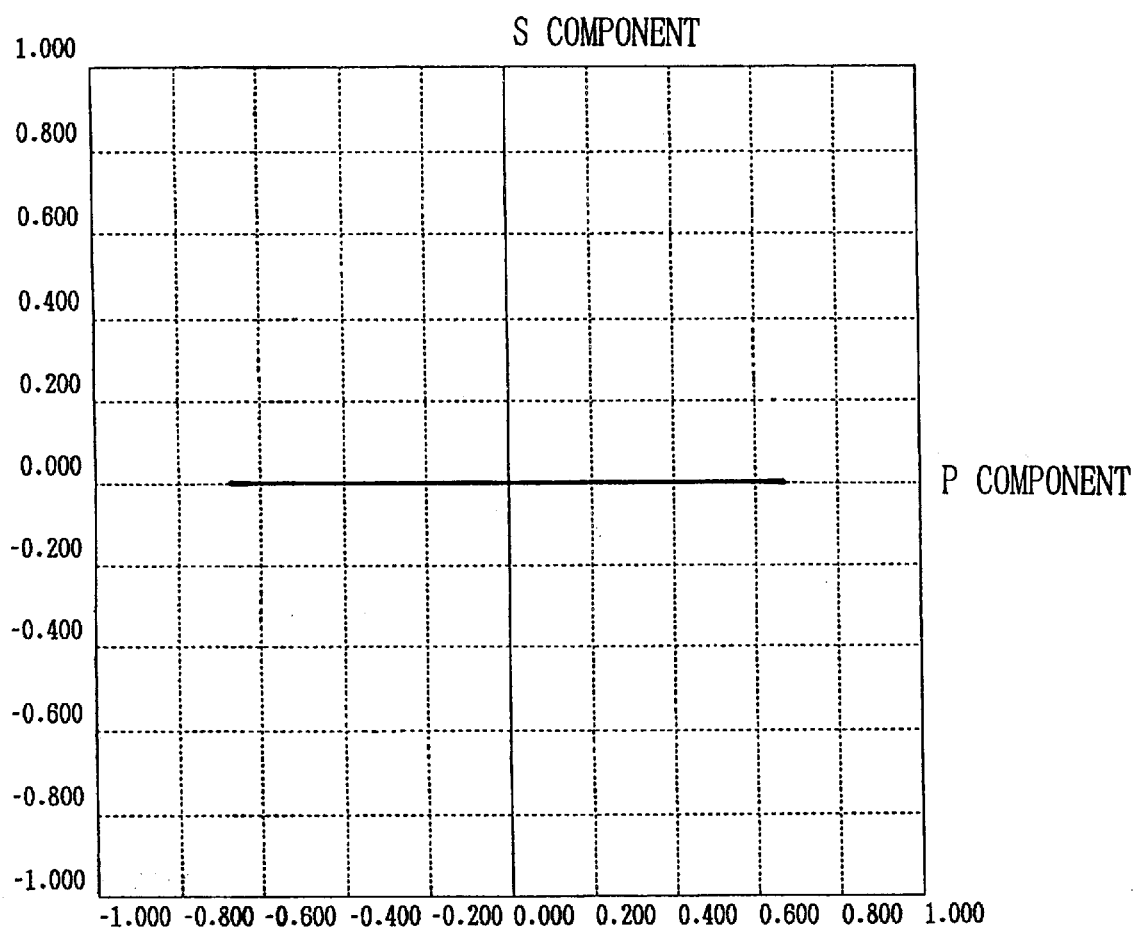
FIG. 4 is a diagram showing a locus of vector of transmitted light when the liquid crystal panel is inoperative as a quarter-wave plate.

Thus, a state of alignment of the liquid crystal molecules M can be freely controlled by the voltage (e) applied to the transparent electrodes 402a. Hence, when information is read back from a CD, the voltage (e) has been set so that the liquid crystal molecules M between the transparent electrodes 402a are aligned in parallel with the optical axis of the objective lens 5 when such voltage (e) is applied to the transparent electrodes 402a. With this setting, since the liquid crystal molecules M between the outer transparent electrodes 402a are aligned in parallel with the optical axis, the liquid crystal between the transparent electrodes 402a no longer acts as a quarter-wave plate. Therefore, the laser beam B consisting of linearly polarized light incident upon the transparent electrode 402a remains unchanged as shown in FIG. 4, even after transmitting through the liquid crystal panel 4.

As described heretofore, the liquid crystal panel 4 is tilted by an amount of the pretilted angle θ and is disposed so that the crystal liquid molecules M are aligned in perpendicular relation to the optical axis of the objective lens 5 when no voltage is applied. As a consequence, the overall area of the liquid crystal panel 4 or the central portion where corresponds to the center aperture pattern 405 can be used to act as a perfect quarter-wave plate. Accordingly, the coefficient of utilization of light is enhanced and there is no leakage of unnecessary light into the light receiver 8. In addition, the S/N ratio can be enhanced.

Furthermore, the glass substrate 401, transparent electrodes 402a, and surface alignment films 403a of the liquid crystal panel 4 are also tilted by the amount of the aforesaid pretilted angle θ. Therefore, even if the laser beam B were reflected at these surfaces, the beam B would be reflected in a direction away from the optical axis of the objective lens 5 and there would be no stray light which would be incident upon the light receiver 8. For this reason, an antireflection film is also made unnecessary.

Figure 5:
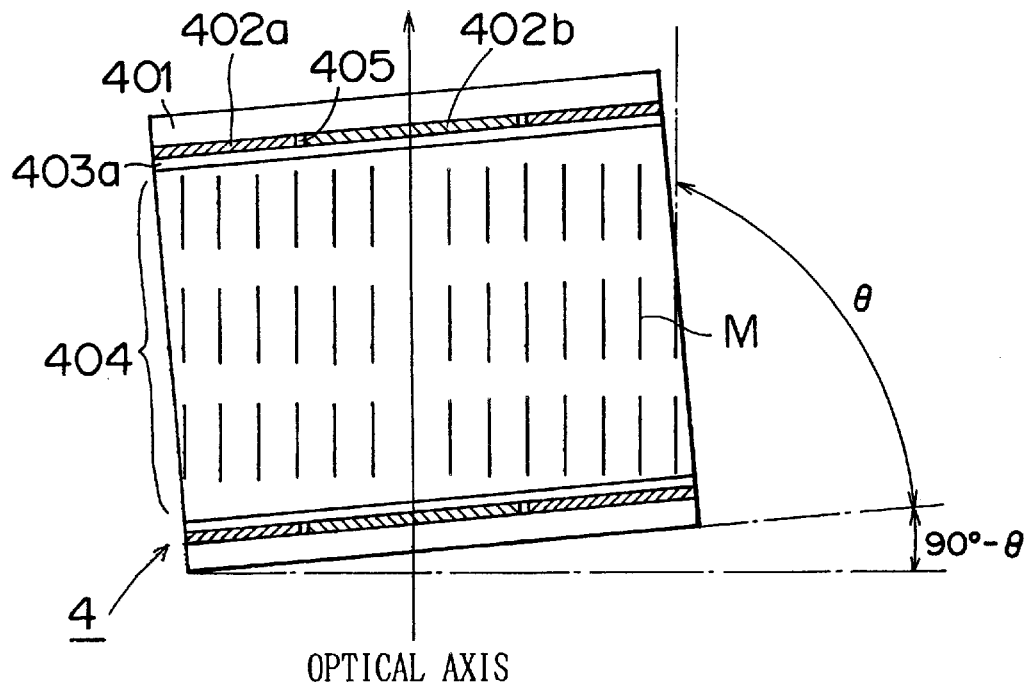
FIG. 5 is an enlarged schematic diagram showing an operation of an N-type liquid crystal panel when no voltage is applied.
Figure 6:
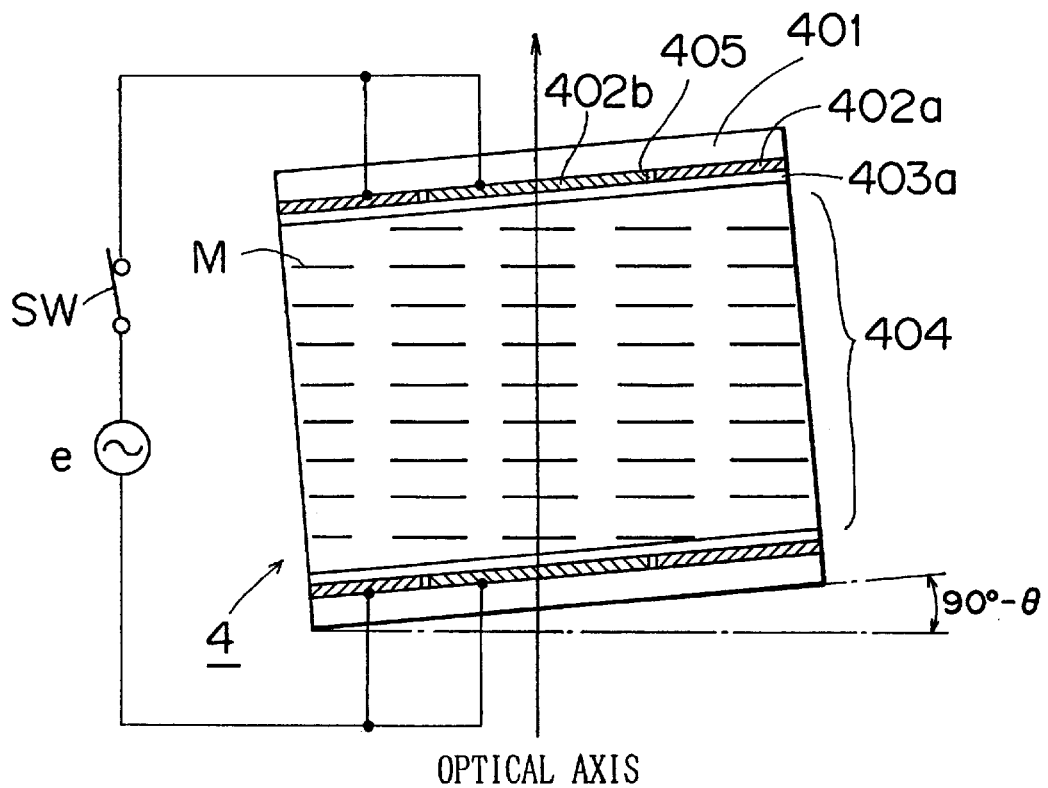
FIG. 6 is an enlarged schematic diagram showing an operation of the liquid crystal panel of FIG. 5 when a voltage is applied to read information from a DVD.
Figure 7:
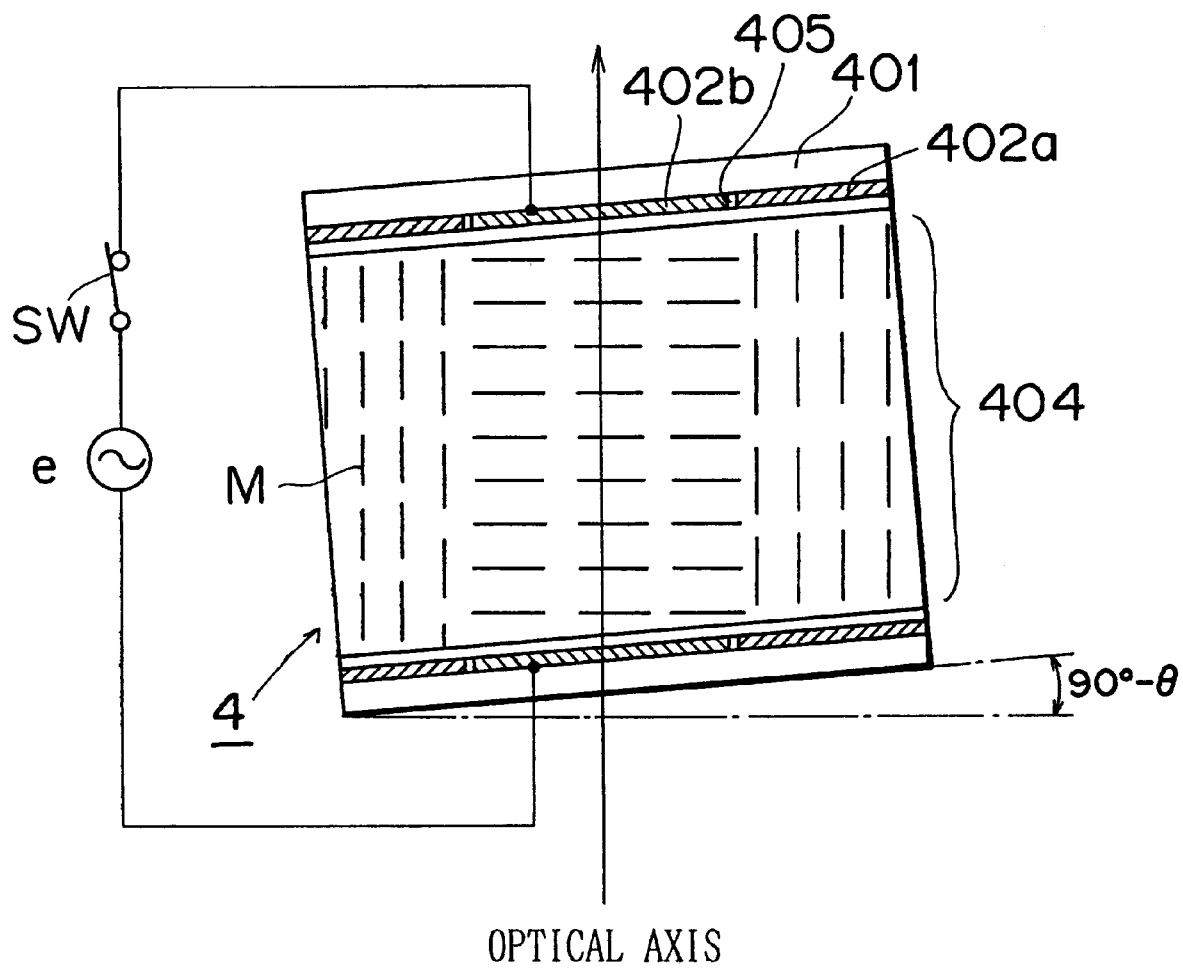
FIG. 7 is an enlarged schematic diagram showing an operation of the liquid crystal panel of FIG. 5 when a voltage is applied to read information from a CD.

In FIGS. 5 through 7 there is shown an example employing an N-type liquid crystal in the aforementioned liquid crystal panel 4. In the N-type liquid crystal panel, the liquid crystal molecules M are of a homeotropic structure to be aligned in perpendicular relation to the glass substrate 401, however, as shown in FIG. 5, the enclosed liquid crystal molecules M are aligned with a predetermined pretilted angle θ (θ=89 to 80°, approximation) by means of surface alignment films 403a. Hence, in the case where the N-type liquid crystal panel 5 is employed, the liquid crystal panel 4 is disposed at an angle of 90°−θ so that the liquid crystal molecules M are aligned in parallel with the optical axis when no voltage is applied, in contrast to the aforesaid P-type liquid crystal panel.

When the N-type liquid crystal panel 4 is employed, it is necessary that the overall area of the liquid crystal panel 4 should act as a quarter-wave plate when reading back information from a DVD. Therefore, it is required to provide the liquid crystal panel with transparent electrodes 402b at the area of the center aperture pattern 405 for voltage application, which are not required for the P-type liquid crystal.

When information is read back from a DVD, voltage (e) is applied to both the center transparent electrodes 402b and outer transparent electrodes 402a, as shown in FIG. 6. A value of the applying voltage (e), as in the aforementioned P-type liquid crystal, is such that when it is applied to the transparent electrodes, the liquid crystal molecules M are aligned in perpendicular to the optical axis of the objective lens 5. By setting the value of the applying voltage (e) in this way, all the liquid crystal molecules M are aligned in perpendicular relation to the optical axis when the voltage is applied on the transparent electrodes. Consequently, the overall area of the liquid crystal panel 4 acts as a perfect quarter-wave plate, and the incident laser beam B consisting of linearly polarized light is emitted as perfect circularly polarized light, such as that shown in FIG. 13, after transmitting through the liquid crystal panel 4.

Figure 13:
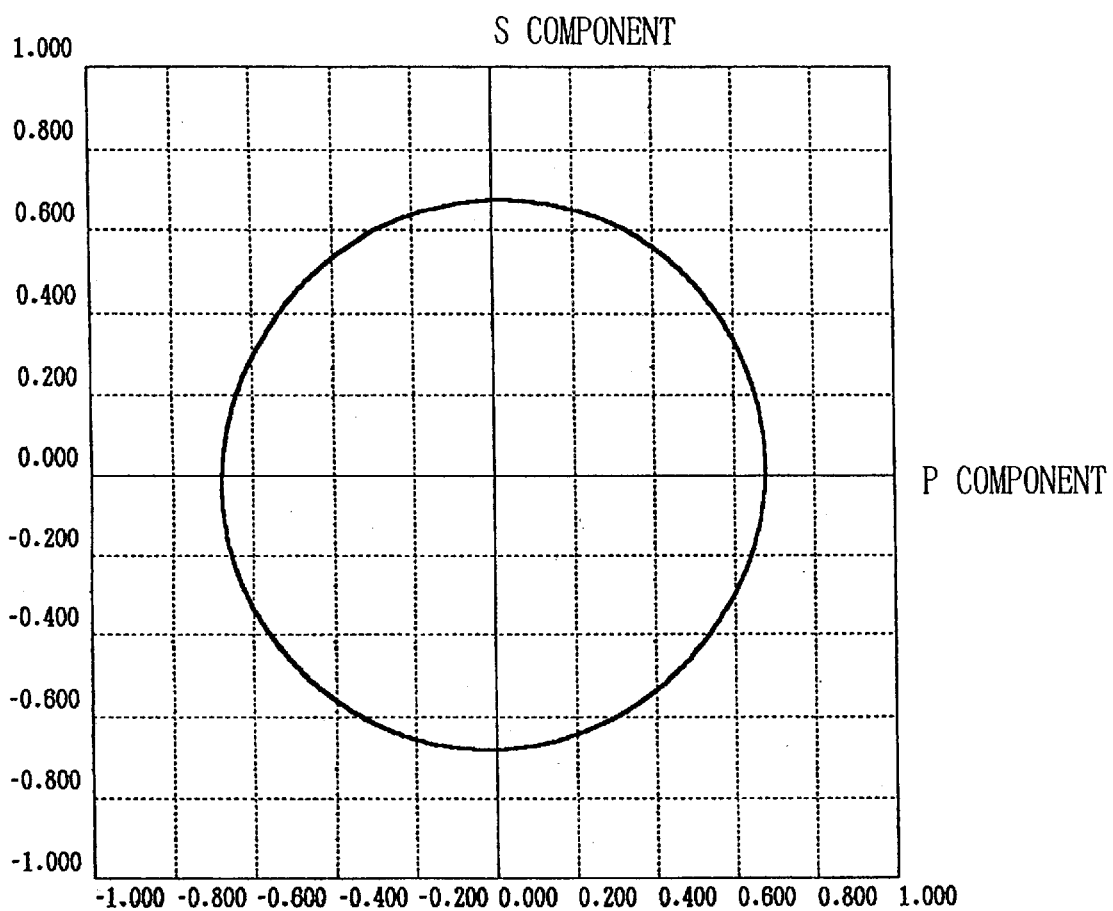
FIG. 13 is a diagram showing a locus of vector of transmitted light when the liquid crystal panel of FIG. 8 is acting as a perfect quarter-wave plate.
Figure 14:
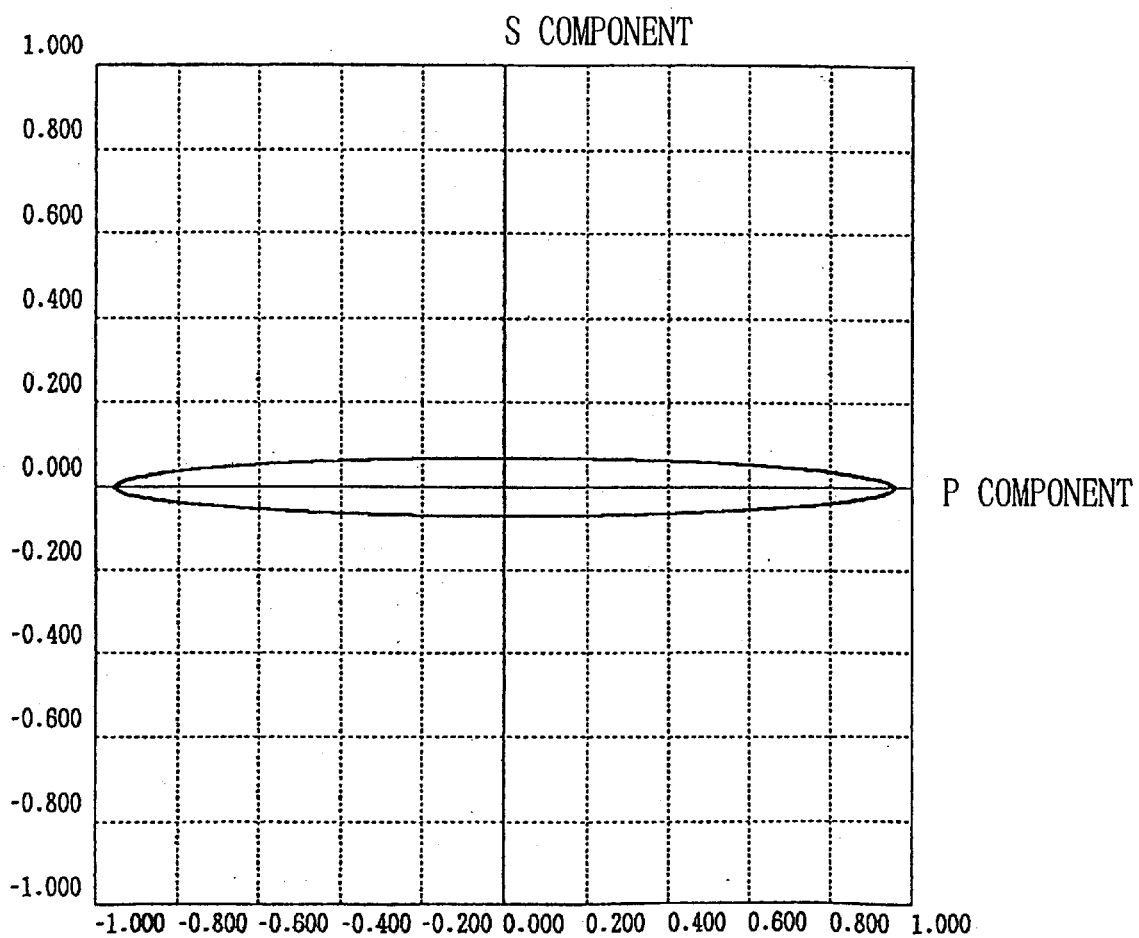
FIG. 14 is a diagram showing a locus of vector of transmitted light when liquid crystal molecules are provided with a pretilted angle.

However, in the case of playing back a CD, such voltage (e) is applied only on the center transparent electrodes 402b provided at the center aperture pattern 405, as shown in FIG. 7. Accordingly, only the central part of the liquid crystal which corresponds to the center transparent electrodes 402b acts as a perfect quarter-wave plate, and the peripheral portion corresponding to the outer transparent electrodes 402a no longer acts as a quarter-wave plate. Accordingly, the laser beam B consisting of linearly polarized light transmitted through the central portion which corresponds to the transparent electrode 402b is converted into perfect circularly polarized light, as shown in FIG. 13, and the laser beam B transmitted through the portion which corresponds to the outer transparent electrodes 402a remains unchanged as linearly polarized light, as shown in FIG. 4.

Thus, even in the case of an N-type liquid crystal panel being employed, by tilting the liquid crystal panel 4 at an angle of 90°−θ, the overall area of the liquid crystal panel 4 or the central portion which corresponds to the center aperture pattern 405 can act as a perfect quarter-wave plate. Accordingly, the coefficient of utilization of light is enhanced and there is no leakage of unnecessary light which enters into the light receiver 8, so the S/N ratio can also be improved.

In addition, the glass substrate 401, transparent electrodes 402a, and surface alignment films 403a of the liquid crystal panel 4 are tilted by the aforementioned amount of the pretilted angle 90°−θ. Therefore, even if the laser beam B were reflected at these surfaces, the beam B would be reflected in a direction away from the optical axis of the objective lens 5 and there would be no stray light which would be incident upon the light receiver 8. For this reason, an antireflection film is also rendered unnecessary.

As has been described above, in the case of a P-type liquid crystal being employed in a liquid crystal panel, the liquid crystal panel is tilted and disposed with a predetermined pretilted angle so that liquid crystal molecules are aligned in perpendicular to an optical axis of the objective lens at the time when no voltage is applied thereon. Also, in the case of an N-type liquid crystal being employed as the liquid crystal panel, the liquid crystal panel is tilted and disposed with a predetermined pretilted angle so that liquid crystal molecules are aligned in parallel with the optical axis of the objective lens at the time when no voltage is applied. In this way, even if the liquid crystal molecules have been given a pretilted angle, the liquid crystal panel could act as a perfect quarter-wave plate, and the coefficient of utilization of light and the S/N ratio can be improved.

While the invention has been described with reference to preferred embodiments thereof, the invention is not to be limited to the details given herein, but may be modified within the scope of the appended claims.

What is claimed is:

1. An optical pickup comprising:

a laser light source; and a liquid crystal panel, disposed between an objective lens and said laser light source, for causing a phase difference in a laser beam emitted from said laser light source, wherein said liquid crystal panel is aligned in a tilted angle to an optical axis of the objective lens.

2. An optical pickup as defined in claim 1, wherein said liquid crystal panel has transparent electrodes for causing a phase difference in the laser beam by applying a voltage thereon.

3. An optical pickup as defined in claim 2, wherein said transparent electrodes are divided into a pattern of predetermined shape, whereby a voltage is applied on each divided region.

4. An optical pickup as defined in claim 3, wherein said applying voltage is varied for each divided region in accordance with a recording medium to be reproduced.

5. An optical pickup as defined in claim 3, wherein said transparent electrodes have a circular aperture pattern at substantially the central portion thereof.

6. An optical pickup as defined in claim 1, wherein said liquid crystal panel includes liquid crystal molecules being provided with a predetermined pretilt angle and said liquid crystal panel is tilted and disposed so that the liquid crystal molecules are aligned in perpendicular relation to the optical axis of said objective lens when no voltage is applied.

7. An optical pickup comprising:

a laser light source;

a polarizing beam splitter;

an objective lens;

a transmission type liquid crystal panel disposed between said objective lens and said polarizing beam splitter, said liquid crystal panel having transparent electrodes formed respectively with an aperture pattern having a predetermined configuration which causes a phase difference of ¼ of a wavelength or an odd multiple thereof in a laser beam when the beam passes through the liquid crystal; and control means for applying a voltage to the transparent electrodes of the liquid crystal panel so that the overall area of the liquid crystal panel is operated as a quarter-wave plate when information is read from or recorded on an optical disk for high-density recording and that only a portion of said aperture pattern is operated as a quarter-wave plate when information is read from an optical disk for low-density recording, wherein said liquid crystal panel includes a P-type liquid crystal being provided with liquid crystal molecules having a predetermined pretilt angle and the liquid crystal panel is tilted and disposed so that the liquid crystal molecules are aligned in perpendicular relation to an optical axis of the objective lens when no voltage is applied.

8. An optical pickup as defined in claim 7, wherein said optical disk for high-density recording is a digital video disk (DVD) and said optical disk for low-density recording is a compact disk (CD).

9. An optical pickup as defined in claim 7, wherein said optical disk for high-density recording is a super-density disk (SD) and said optical disk for low-density recording is a compact disk (CD).

10. An optical pickup comprising:

a laser light source;

a polarizing beam splitter;

an objective lens;

a transmission type liquid crystal panel disposed between the objective lens and the polarizing beam splitter, said liquid crystal panel having transparent electrodes formed respectively with an aperture pattern having a predetermined configuration which causes a phase difference of ¼ of a wavelength or an odd multiple thereof in a laser beam when the beam passes through the liquid crystal; and control means for applying a voltage to the transparent electrodes of the liquid crystal panel so that the overall area of the liquid crystal panel is operated as a quarter-wave plate when information is read from or recorded on an optical disk for high-density recording and that only a portion of said aperture pattern is operated as a quarter-wave plate when information is read from an optical disk for low-density recording, wherein said liquid crystal panel includes an N-type liquid crystal being provided with liquid crystal molecules having a predetermined pretilt angle and the liquid crystal panel is tilted and disposed so that the liquid crystal molecules are aligned in parallel with an optical axis of the objective lens when no voltage is applied.

11. An optical pickup as defined in claim 10, wherein said optical disk for high-density recording is a digital video disk (DVD) and said optical disk for low-density recording is a compact disk (CD).

12. An optical pickup as defined in claim 10, wherein said optical disk for high-density recording is a super-density disk (SD) and said optical disk for low-density recording is a compact disk (CD).

13. An optical reproducer being installed with said optical pickup defined in any one of said claims 1 through 12, comprising:

reproducing means for reproducing recorded information from a recording medium by detecting reflected light therefrom;

discriminating means for discriminating a type of the recording medium; and control means for controlling an applying voltage onto the liquid crystal panel based on a resultant of said discriminating means.

14. An optical reproducer as defined in claim 13, wherein said control means controls said liquid crystal panel so that only a portion of said circular aperture pattern is operated as a quarter-wave plate when information is read from an optical disk for low-density recording and that the overall area of the liquid crystal panel is operated as a quarter-wave plate when information is read from or recorded on an optical disk for high-density recording.

* * * * *